(12) United States Patent
Wynne et al.

(10) Patent No.: US 7,854,857 B2
(45) Date of Patent: *Dec. 21, 2010

(54) FORMULATION FOR DUST ABATEMENT AND PREVENTION OF EROSION

(75) Inventors: James H Wynne, Alexandria, VA (US); Barry J Spargo, Washington, DC (US); Christopher T Lloyd, Springfield, VA (US); Warren W Schultz, Edgewater, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/609,350

(22) Filed: Oct. 30, 2009

(65) Prior Publication Data

US 2010/0047443 A1    Feb. 25, 2010

Related U.S. Application Data

(62) Division of application No. 10/778,707, filed on Feb. 12, 2004, now abandoned.

(60) Provisional application No. 60/471,445, filed on May 16, 2003.

(51) Int. Cl.
    *C09K 3/22* (2006.01)
(52) U.S. Cl. ................................ 252/88.1; 252/88.2
(58) Field of Classification Search .................. None
    See application file for complete search history.

(56) References Cited

U.S. PATENT DOCUMENTS

| | | | | |
|---|---|---|---|---|
| 2,436,146 A | * | 2/1948 | Kleinicke | 252/88.1 |
| 2,443,766 A | * | 6/1948 | Hedberg | 252/88.2 |
| 4,960,532 A | * | 10/1990 | Kremer | 252/88.1 |
| 5,873,187 A | | 2/1999 | Kozak et al. | |
| 6,217,252 B1 | | 4/2001 | Tolliver et al. | |
| 6,692,566 B2 | | 2/2004 | Kelly et al. | |
| 6,861,090 B2 | | 3/2005 | Kelly et al. | |

OTHER PUBLICATIONS

U.S. Appl. No. 10/584,555, filed Feb. 16, 2007.

* cited by examiner

*Primary Examiner*—Necholus Ogden, Jr.
(74) *Attorney, Agent, or Firm*—Amy L. Ressing; Joseph T. Grunkemeyer

(57) ABSTRACT

A safe, biodegradable, environmentally benign, non-toxic, water-soluble solution consisting of water, sugar, starch, sodium phosphate, and surfactant that can be applied to dust and sand particles to bind the particles and form a hardened crust. Also disclosed is the related method for abating dust and preventing erosion.

7 Claims, No Drawings

US 7,854,857 B2

FORMULATION FOR DUST ABATEMENT AND PREVENTION OF EROSION

The present application is a divisional application of U.S. application Ser. No. 10/778,707, filed on Feb. 12, 2004, which claims priority from U.S. Provisional Application No. 60/471,445 filed May. 16, 2003, the entire contents of which are incorporated herein by reference.

FIELD OF THE INVENTION

The present invention relates to dust abatement and, more specifically, to a crust-forming aqueous solution that aids in the abatement of dust and sand and in the prevention of wind erosion.

DESCRIPTION OF THE RELATED ART

Dust abatement issues have been a major concern for the U.S. military dating as far back as World War II. To date, polyacrylamide (PAM) is used as a soil stabilizer on roads and airfields to reduce the amount of airborne dust and sand particles. More recently, there have been several incidents involving the hard decking of military aircraft as a result of limited visibility due to dust and airborne sand brownouts. Tests have been performed utilizing PAM and were successful in a few cases; however, there are several major concerns with the application of PAM. The quantity of water required to effectively apply PAM is a concern, especially in desert environments. The well-documented carcinogenic properties associated with its residual monomer, acrylamide, which is contained within, are an even greater cause for attention. Also, the application of PAM can be a very labor-intensive operation. These concerns suggest the need for a much safer more environmental solution that would be less of a logistical burden.

The use of PAM for reduction of irrigation-induced erosion has also increased in recent years; however, its toxicity and environmental fate in this application remains a concern. PAM is a water-soluble, high molecular weight, synthetic organic polymer that interacts with the clay found in some soils. The interaction depends upon the properties of the polymer as well as the characteristics of the soil. It is effective in stabilizing soil aggregates, reducing soil erosion, increasing water infiltration, and also has an indirect positive impact upon crop growth and yield. In general, PAM degradation occurs through physical breakdown. PAM itself has been shown to be non-toxic to animals, fish and plants; however, the toxicity of its residual monomer (acrylamide) is a known neurotoxin to humans. The major source of acrylamide that is released into the environment is from the use of polyacrylamide products. As a result of such use, FDA regulates the content of PAM and its residual monomer present in food products. See C. A. Seybold, *Communications in Soil Science and Plant Analysis* 1994, 25, 2171-2185 and D. J. King, R. R. Noss, *Reviews on Environmental Health* 1989, 8, 3-16, both of which are incorporated herein by reference.

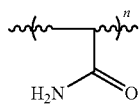

Structure of Polyacrylamide (PAM)

PAM has been shown to be very effective in controlling water erosion from furrow irrigation. Laboratory and field wind tunnel tests using several formulations and rates of PAM were reported to determine its possible use for forming wind erosion-resistant surfaces (crusts). These tests showed that PAM was no more effective than natural rainfall for wind erosion control within general agricultural conditions. See D. V. Armburst, *Journal of Soil and Water Conservation* 1999, 54, 557-559, incorporated herein by reference.

Research has also been performed to optimize the binding ability of PAM to various types of clay minerals. It was determined that the efficacy of cationic and anionic PAM increased effectiveness of dispersed clays; however, the non-neutral pH materials pose additional environmental and health concerns. See D. A. Laird, *Soil Science* 1997, 162, 826-832, incorporated herein by reference.

Use of PAM for the reduction of pesticide contamination through runoff from agricultural fields and wind erosion-resistant surfaces has also been studied. The formation of the crust has been reported to retain moisture in the sand/soil and prevent rapid evaporation in arid conditions. See G. Singh, J. Letey, P. Hanson, P. Osterli, & W. F. Spencer, *Journal of Environmental Science Health Part B* 1996, 31, 25-41, incorporated herein by reference.

The application of PAM in landing zone environments is a multi-step process. The procedure generally starts by an initial application of water followed by an application of a select sorbent. The sorbent is then mixed into the soil/sand by agitation. Typically, this technique employs such instruments as a garden hoe or a leaf rake. After mixing, an additional application of water is made followed by treatment with polyacrylamide, which is typically applied in the form of a high molecular weight solid ground polymer. Due to the toxicity of residual monomer present in the PAM polymer mixture, special personal protective equipment must be utilized by those handling the material in fine powder form. Also, aired conditions promote sublimation of residual monomer, which again poses a health concern to the end users. This is yet again manually mixed into the soil, and a final application of water is made to complete the process.

The use of sugar has been noted in multiple commercial applications; however, there are few reports that are relevant. Patents for formulations involving sugar have been utilized to prevent fertilizer granule caking (see, e.g., U.S. Pat. No. 5,328,497 to Hazlett, which is incorporated herein by reference) and to reduce dust formation from detergent tablets (see, e.g., U.S. Pat. No. 6,376,454 to Eggersmann et al., which is incorporated herein by reference). In addition, a polysaccharide comprising of at least nine monosaccharide units suspended in an oil base with thickeners and emulsifiers has been used for dust suppression (see, e.g., U.S. Pat. No. 5,595,782 to Cole, which is incorporated herein by reference).

Other products such as emulsions of polyvinyl acetate and esters of polyvinyl alcohols have been reported to effectively promote surface consolidation of soil and cements. See J. M. Geist, S. V. Amagna, B. B. Mellor, *Industrial and Engineering Chemistry* 1953, 45, 759-767 and U.S. Pat. No. 6,122,860 to Von Tapavicza et al., both of which are incorporated herein by reference. To a lesser degree various foaming agents functioning as elastomeric insoluble polymers have also been utilized in dust suppression (see, e.g., U.S. Pat. No. 4,551,261 to Salihar, which is incorporated herein by reference). Partly olefinically unsaturated fatty acids of triglycerides as biodegradable plasticizers in dispersions have been utilized for surface stabilization of sand and soil (see, e.g., U.S. Pat. No.

5,846,601 to Ritter et al., which is incorporated herein by reference). Various compositions consisting of primarily lignin sulfonate have been demonstrated to stabilize soil formations from the effects of water (see, e.g., U.S. Pat. No. 4,394,213 to Ferm, which is incorporated herein by reference).

With the aforementioned documented problems and limited scope, there is clearly a need for an aqueous formulation that is environmentally friendly and can be easily applied in a single step for the purpose of dust abatement and prevention of wind erosion.

SUMMARY

The aforementioned problems of the current technology are overcome by the present invention wherein a safe, biodegradable, environmentally-benign, non-toxic, water-soluble solution can be applied to dust and sand to bind the particles forming a hardened crust top layer. The solution consists of a mixture of water, sugar, starch, sodium phosphate, and soap/surfactant. Once applied, the wetted layer dries to form a wind erosion-resistant surface (crust). Upon formation of the hardened crust and times prior thereto, binding occurs insomuch as to be effective immediately upon application. Heat and windy conditions promote the effectiveness of this product.

According to a preferred embodiment, a composition of matter suitable for dust abatement and prevention of erosion comprises between about 1 and 70% (w/w) sugar, between about 0 and 70% (w/w) of a polysaccharide, between about 0 and 30% (w/w) phosphate, between about 0 and 30% (w/w) of a surfactant, and between about 20 and 99% (w/w) water, wherein when the said solution is applied to sand or dust particles, the solution binds to the sand or dust particles and forms a hardened crust. Another embodiment of the present invention is a method for abating dust and preventing erosion, comprising the steps of (a) preparing a solution comprising between about 1 and 70% (w/w) sugar, between about 0 and 70% (w/w) of a polysaccharide, between about 0 and 30% (w/w) phosphate, between about 0 and 30% (w/w) of a surfactant, and between about 20 and 99% (w/w) water; (b) applying the solution to sand or dust particles wherein the solution binds to the particles; and (c) allowing the sand or dust particles to dry thereby forming a hardened crust.

The present invention has several advantages over existing technology and current techniques, including the following: it is environmentally friendly; it is a simple, one-step application; it is non-toxic, non-flammable, and biodegradable; it is cost effective; it requires less water than other dust palliatives; it has increased binding strength over PAM and other products; it is easy to prepare and apply; desert conditions increase its effectiveness; it is immediately effective upon application; it is effective on a variety of particle sizes ranging from less than 1 μm to greater than 500 μm; it is effective on a variety of types of dusts and sands, including silicas, clays and carbonates; it has increased shelf-life; it will not harden nor degrade in solution form upon storage; and it withstands generated wind shear up to 50 psf.

DETAILED DESCRIPTION OF THE PREFERRED EMBODIMENTS

In a preferred embodiment, an optimum highly effective solution consists of a mixture of 24% (w/w) sugar (sucrose), 15% (w/w) starch, 0.1% (w/w) sodium phosphate, 0.03% (w/w) soap/surfactant (e.g. Dawn®), and 61% (w/w) water. The sugar and the water are the primary active ingredients within the solution. The concentrations of these components within the mixture may be varied while maintaining effectiveness of the solution, within the ranges listed below. Additionally, a small amount (<1%) of a biocide, fungicide, or combination of biocide and fungicide may be added to enhance storage stability. The application of the described solution is effective at temperature ranges from 0 to 150° F.

The solution may consist of 20 to 99% (w/w) water.

The sugar content in the solution may range from 1 to 70% (w/w). The sugar can be in a solid form or a liquid form (e.g., syrup or corn syrup). Several alternatives in part or in whole, may be substitutes for the sugar (sucrose) in the mixture. Any form of a monosaccharide (e.g. glucose, fructose) or disaccharide (e.g. maltose) may be substituted for the sugar in the solution while obtaining similar binding effects.

The percent starch in the solution may range from 0 to 70% (w/w). Any form of a polysaccharide (e.g. cellulose) may be substituted for the starch without decrease in the effectiveness of the solution.

The concentration of soap may be varied from 0 to 30% in the solution (functioning as a surfactant). Similar surfactants including, but not limited to, any quaternary ammonium salt or mixture there of, may be substituted for the soap.

The sodium phosphate concentration may be varied from 0 to 30% in the solution mixture. This additive may function as a mordant and may be substituted for other similar compounds, such as automatic detergent, laboratory glassware detergent, carbonates, phosphates or other sulfates.

Studies involving varying the concentrations of each of the components within the solution were performed to examine effectiveness. Solutions were applied to sand of various compositions and particle sizes. Particle sizes ranged from <1 μm to >500 μm. Sand compositions consisted of carbonate, silica, clay, mixes and others. Application was made using hand held bottle sprayers, garden sprayers, hydro-seeders, an agricultural sprayer, commercial and military automated pump sprayers, fire trucks, and combinations thereof. The sand was allowed to dry in ambient conditions with times ranging from 1 second to 48 hours. Hardening of surface was increased with prolonged drying times, increased temperature, decreased humidity, or combinations thereof.

For purposes of reducing occurrences involving helicopter hard decking due to brownouts, tests were performed in ambient outdoor conditions using a high-velocity wind-generating fan. Three feet by three feet areas of sand were prepared and the described solution was applied. Various surfaces were examined to include groomed and rough terrain and hills. Upon complete drying and hardening, top crusts were formed with varying thickness depending upon volume of solution applied. The solution may be applied in volumes ranging from 1 mL to 20 liters per square foot. The wind generator was placed directly over the sand. The generated wind speed was varied from speeds of 5,000 rpm to 15,000 rpm. Heavy-lift military helicopters are known to produce downwind forces equivalent to 7,500 rpm upon landing and take-off.

Experimental Details

General Procedure for Preparation of the Embodied Solution

In this example, commercial materials were employed in the preparation of the described solution. To a 4 L beaker equipped with magnetic stirrer were added 2 L of water and 800 grams of sugar (sucrose). While stirring at a rate of 870 rpm, at room temperature, the sugar was allowed to dissolve over a period of about 5 minutes. The solution became homogeneous prior to the addition of 0.5 liters of starch, 3 grams of sodium phosphate, and 1 gram of liquid dishwashing soap/surfactant (a 15% aqueous cetyldimethylethylene ammonium bromide (CDEAB) solution). The resulting solution was allowed to stir for an additional 10 minutes to ensure complete mixing.

General Procedure for Application and Evaluation

The formulated solution was placed in a 32-ounce spray bottle and applied to a variety of sands with varying particle sizes. The sand was allowed to dry in ambient conditions with times ranging from 1 seconds to 48 hours. Hardening was increased with prolonged periods of drying and/or addition of heat. Surface hardness tests were performed during the drying process by applying weight in excess of 10 pounds to four-inch by four-inch areas of the top crust layer of the treated sand. As a result, the crust withstood the force applied, 90 psf, with no visible signs of disturbance to the treated layer.

Tests were performed outdoors using a high-velocity wind generator. Conditions for these tests ranged from 65 to 80° F. with 10 to 20% relative humidity. Three feet by three feet (9 $ft^2$) areas of sand with various particle sizes were treated with 50 mL of the formulated solution using a 2-gallon garden sprayer. The wind generator was placed directly over the sand/dust and speed ramped from a velocity of 5,000 rpm, generating 10 psf, to 15,000 rpm, generating 50 psf.

Currently, heavy-lift military helicopters are known to produce downward wind forces of approximately 17 psf, (~7,500 rpm) during take-off and landing. This confirms that the formulated solution is very effective in such applications as preparing landing zones for heavy-lift military helicopters. Reapplication to broken surfaces also proved successful.

Because the formulated solution is effective for situations where high velocity wind forces are introduced, a direct parallel can be drawn (extrapolated) to include the utility of this product in agricultural applications, where wind erosion prevention is needed.

After successful laboratory experimentation, a field test was conducted in a desert area of the Marine Corps Air Station in Yuma, Ariz. A landing zone area was designated 200 feet by 200 feet, and then subdivided into two areas, thus creating two 100 feet by 200 feet areas. In both cases, the solution was premixed by agitation in a 700-gallon water bladder and then subsequently sprayed onto the desert floor/surface. A 3.5 horsepower gasoline powered garden pump was used to supply the prepared solution through two 1½-inch flexible water hoses. The spray guns employed were connected to the flexible water hose using a threaded PVC adapter. The dimensions of this apparatus employed for this case was a 1½ inch PVC pipe with cutoff valve and a terminal reducing coupling to 1 inch at the exit point.

EXAMPLE 1

On one area, a dilute formulation was applied. The dilute formulation consisted of 1,200 pounds granulated sugar, 250 milliliter dishwashing liquid, 1 pound phosphate salt, 150 pound starch and 1200 gallons of water.

EXAMPLE 2

In the second area, the formulation consisted of a more concentrated formulation. The more concentrated formulation consisted of 1,200 pounds granulated sugar, 250 milliliters dishwashing liquid, 1 pound phosphate salt, 150 pound starch and 400 gallons of water.

In both examples, the results were excellent. Within minutes of application and evaporation of the water, a solid hardened crust formed. The following day, helicopters landed on both of the test sites multiple times with almost complete reduction of airborne sand and dust. Even the areas of the surface that were damaged by the landing gear and/or landing wheels automatically self-healed to regenerate a top hardened surface. Various military helicopters performed landings, touch-and-goes, and hovering maneuvers the following day with equal success.

Examples 3 and 4 below describe additional field testing that was done using corn syrup as the sugar. Again, the results were excellent with a solid hardened crust forming within minutes of application and evaporation of the water.

EXAMPLE 3

The solution consisted of 130 gallons of corn syrup, 4 pounds phosphate salt, 2.5 gallons liquid starch, 300 mL of liquid soap and 865 gallons of water.

EXAMPLE 4

The solution consisted of 130 gallons of corn syrup, 4 pounds phosphate salt, 2.5 gallons liquid starch, 300 mL of liquid soap and 1265 gallons of water.

The above description is that of a preferred embodiment of the invention. Various modifications and variations are possible in light of the above teachings. It is therefore to be understood that, within the scope of the appended claims, the invention may be practiced otherwise than as specifically described. Any reference to claim elements in the singular, e.g. using the articles "a," "an," "the," or "said" is not construed as limiting the element to the singular.

What is claimed is:

1. A method for dust and sand abatement and preventing erosion, comprising the steps of:

(a) preparing an aqueous solution comprising between about 1 and 70% (w/w) sucrose, between about 15 and 70% (w/w) of a water soluble starch, between about 0 and 30% (w/w) of a detergent, between about 0 and 30% (w/w) of a surfactant, and between about 20 and 84% (w/w) water;

(b) applying the solution to sand or dust particles wherein the solution binds to the particles; and (c) allowing the sand or dust particles to dry thereby forming a hardened crust.

2. The method of claim 1, wherein said surfactant is selected from the group consisting of soaps, quaternary ammonium salts, and combinations thereof.

3. The method of claim 1, wherein said detergent is selected from the group consisting of sodium phosphate, phosphates, carbonates, sulfates, and combinations thereof.

4. The method of claim 1, wherein said composition comprises 24% (w/w) sucrose, 15% water soluble starch, 0.1% (w/w) sodium phosphate, 0.03% (w/w) of a surfactant, and 61% (w/w) water.

5. The method of claim 4, wherein said surfactant is a soap.

6. The method of claim 1, wherein said solution additionally comprises up to 1% of a biocide, a fungicide, or combinations thereof.

7. The method of claim 1, wherein said solution is applied by using a hand held bottle sprayer, a garden sprayer, a pump sprayer, a hydro-seeder, an agricultural sprayer, a fire truck, an aircraft sprayer, or any combination thereof.

* * * * *